United States Patent
Chang et al.

(10) Patent No.: US 7,620,751 B2
(45) Date of Patent: Nov. 17, 2009

(54) COMMAND SCHEDULING AND AFFILIATION MANAGEMENT FOR SERIAL ATTACHED STORAGE DEVICES

(75) Inventors: Nai-Chih Chang, Shrewsbury, MA (US); Victor Lau, Marlboro, MA (US); Pak-lung Seto, Shrewsbury, MA (US)

(73) Assignee: Intel Corporation, Santa Clara, CA (US)

( * ) Notice: Subject to any disclaimer, the term of this patent is extended or adjusted under 35 U.S.C. 154(b) by 529 days.

(21) Appl. No.: 11/237,449

(22) Filed: Sep. 27, 2005

(65) Prior Publication Data

US 2007/0088860 A1 Apr. 19, 2007

(51) Int. Cl.
*G06F 3/00* (2006.01)
*G06F 13/12* (2006.01)
*G06F 13/38* (2006.01)
*G06F 5/00* (2006.01)

(52) U.S. Cl. ............... 710/50; 710/5; 710/6; 710/8; 710/11; 710/62

(58) Field of Classification Search ............ 710/5, 710/6, 8, 11, 50, 62; 709/230
See application file for complete search history.

(56) References Cited

U.S. PATENT DOCUMENTS

| | | | | |
|---|---|---|---|---|
| 6,134,617 | A | * | 10/2000 | Weber .................... 710/105 |
| 6,434,590 | B1 | * | 8/2002 | Blelloch et al. ............ 718/102 |
| 6,493,782 | B1 | * | 12/2002 | Verdun et al. ............. 710/300 |
| 6,917,992 | B2 | | 7/2005 | Grimsrud |
| 2002/0138670 | A1 | * | 9/2002 | Johnson ..................... 710/6 |
| 2003/0056034 | A1 | * | 3/2003 | Olds et al. ................. 710/5 |
| 2005/0166014 | A1 | * | 7/2005 | Kobayashi et al. ........ 711/112 |

OTHER PUBLICATIONS

Intel Corporation, "Serial ATA II Native Command Queuing Overview", Apr. 2003, 21 pages.

* cited by examiner

*Primary Examiner*—Henry W. H. Tsai
*Assistant Examiner*—Kris Rhu
(74) *Attorney, Agent, or Firm*—Christopher K. Gagne

(57) ABSTRACT

According to one embodiment, a host device is disclosed. The host device includes a logic component to provide an indication of a number of commands issued to a target device, and a task scheduler to schedule commands based on the number of issued commands provided by the logic component.

20 Claims, 6 Drawing Sheets

COMMAND SCHEDULING AND AFFILIATION MANAGEMENT FOR SERIAL ATTACHED STORAGE DEVICES

FIELD OF THE INVENTION

The present invention relates to computer systems; more particularly, the present invention relates to computer system interaction with hard disk drives.

BACKGROUND

Serial attached storage protocols, such as serial ATA (SATA) and serial Small Computer System Interface (SCSI) (SAS) are becoming more prevalent for connecting storage devices to a computer system. In computer systems implementing such serial storage devices, one storage device in the system may communicate with others. For example, a device requesting data (referred to as the initiator device) may receive data from a target device.

In the Serial ATA 2 (Extension to SATA 1.0a) standard, a Native Command Queuing (NCQ) is introduced to use First Party DMA (FPDMA) commands to issue multiple (e.g., up to 32) outstanding read or write commands to target devices. Along with the NCQ protocol, several host controller registers are defined in the standard (e.g., SActive Register, SNotification Registers, etc.). The SActive value represents a set of outstanding NCQ commands that have yet to be completed. The value is bit significant with each bit position representing the status of a pending NCQ command with corresponding TAG values. The bits of SActive register are set by the host when issuing new NCQ commands and are cleared by the target's final response via Set Device Bits FIS.

Typical SATA NCQ commands are issued to the SAS transport layer via firmware. As a result, the firmware has to track the number of NCQ commands that have been issued to the target. When the NCQ status returns back to the host via Set Device Bits FIS, the receive hardware has to return the status to the firmware to be processed. Having to use firmware to track the number of NCQ commands that have been issued to a target slows performance for the transaction.

BRIEF DESCRIPTION OF THE DRAWINGS

The invention is illustrated by way of example and not limitation in the figures of the accompanying drawings, in which like references indicate similar elements, and in which.

DETAILED DESCRIPTION

A mechanism for hardware assisted SATA NCQ command scheduling and Serial ATA Tunneling Protocol (STP) affiliation management using a host controller SActive Register is described. In the following detailed description of the present invention numerous specific details are set forth in order to provide a thorough understanding of the present invention. However, it will be apparent to one skilled in the art that the present invention may be practiced without these specific details. In other instances, well-known structures and devices are shown in block diagram form, rather than in detail, in order to avoid obscuring the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Figure 1:
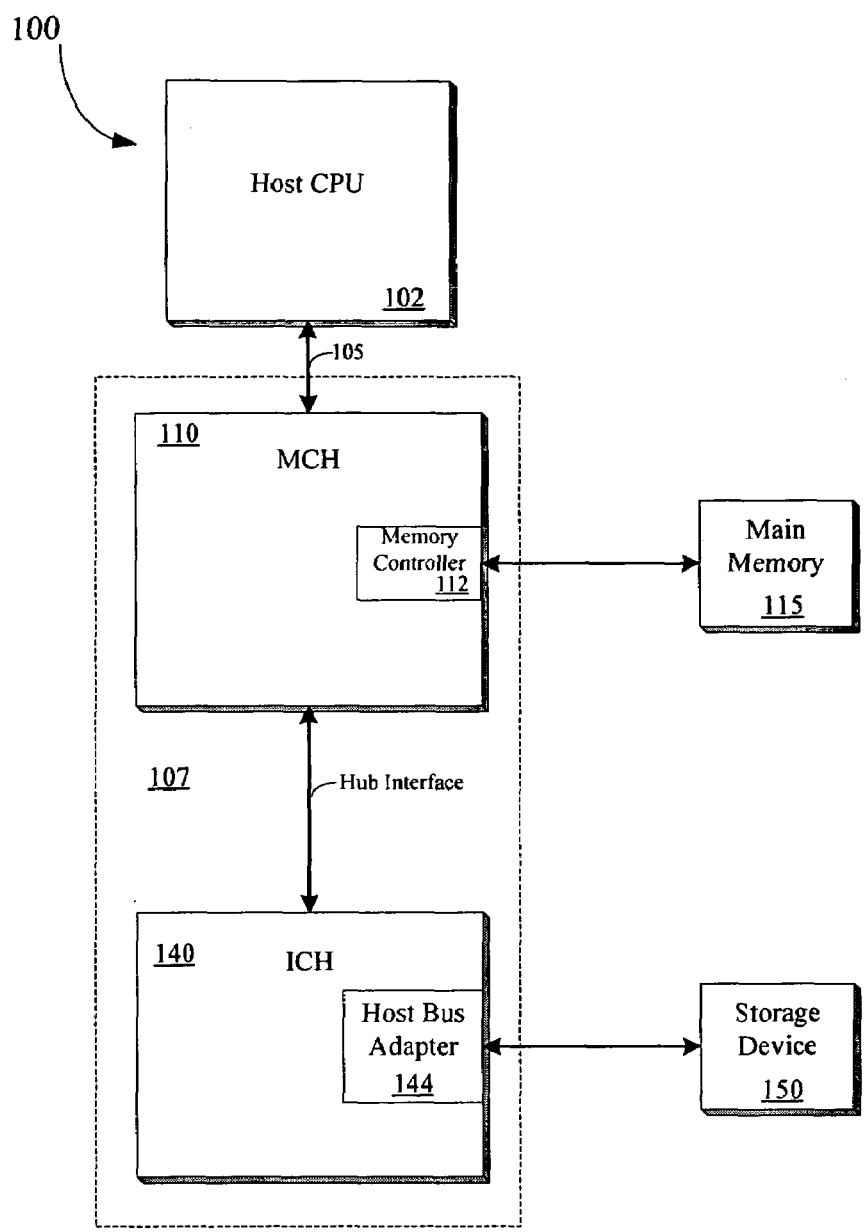
FIG. 1 is a block diagram of one embodiment of a computer system.

FIG. 1 is a block diagram of one embodiment of a computer system 100. Computer system 100 includes a central processing unit (CPU) 102 coupled to an interface 105. In one embodiment, CPU 102 is a processor in the Pentium® family of processors Pentium® IV processors available from Intel Corporation of Santa Clara, Calif. Alternatively, other CPUs may be used. For instance, CPU 102 may be implemented using multiple processing cores. In other embodiments, computer system 100 may include multiple CPUs 102

In a further embodiment, a chipset 107 is also coupled to interface 105. Chipset 107 includes a memory control hub (MCH) 110. MCH 110 may include a memory controller 112 that is coupled to a main system memory 115. Main system memory 115 stores data and sequences of instructions that are executed by CPU 102 or any other device included in system 100. In one embodiment, main system memory 115 includes dynamic random access memory (DRAM); however, main system memory 115 may be implemented using other memory types. Additional devices may also be coupled to interface 105, such as multiple CPUs and/or multiple system memories.

MCH 110 is coupled to an input/output control hub (ICH) 140 via a hub interface. ICH 140 provides an interface to input/output (I/O) devices within computer system 100. ICH 140 may support standard I/O operations on I/O busses such as peripheral component interconnect (PCI), accelerated graphics port (AGP), universal serial bus (USB), low pin count (LPC) bus, or any other kind of I/O bus (not shown).

According to one embodiment, ICH 140 includes a host bus adapter (HBA) 144. HBA 144 serves as a controller implemented to control access to one or more hard disk drives 150. In one embodiment, storage device 150 is a serial SCSI (SSP) drive. However in other embodiments, storage device 150 may be implemented as other serial protocols.

Figure 2:
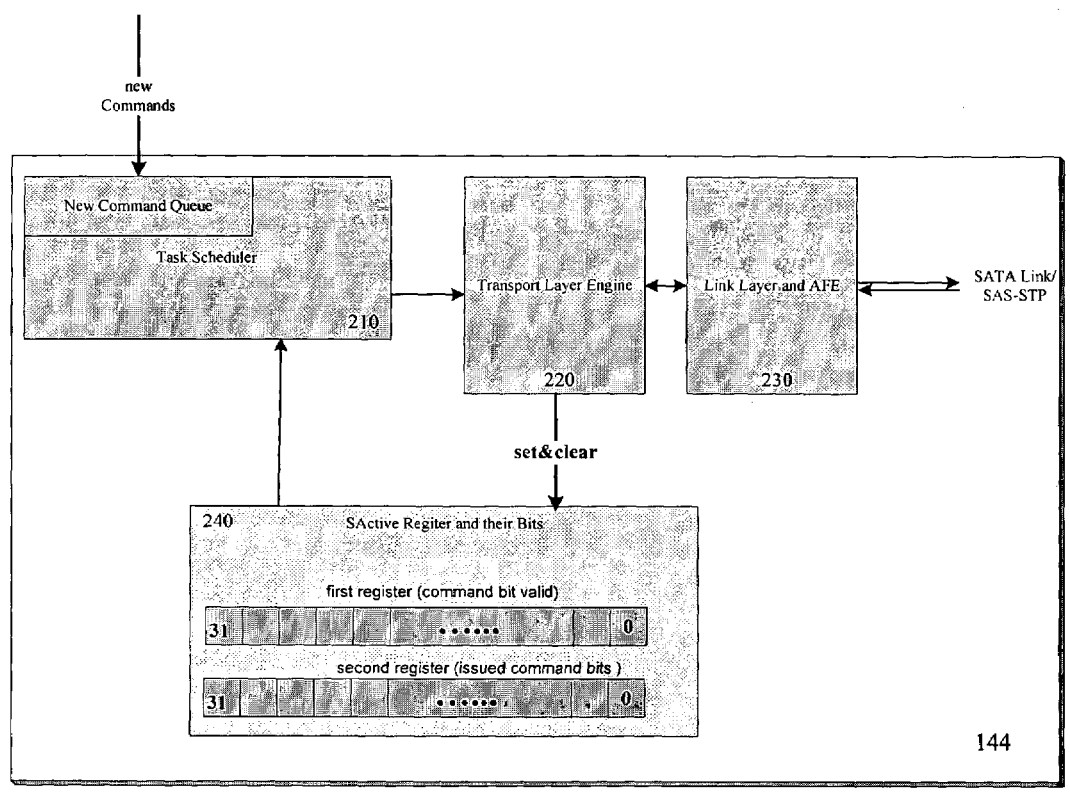
FIG. 2 illustrates one embodiment of a host bus adapter.

FIG. 2 illustrates one embodiment of HBA 144. HBA 144 includes a task scheduler 210, transport layer engine 220, link layer and AFE 230 and SActive register 240. Task scheduler 210 assigns tasks to transport layer engine. Such tasks may include SATA NCQ commands. In one embodiment, task scheduler 210 monitors bits in the SActive register 240 and determines whether or not to issue new NCQ command to a target device via a SATA link/SAS-STP.

According to one embodiment, register 240 is implemented in hardware and includes 32 bits (0-31) to track NCQ commands. However, register 240 may accept only a number of commands that correspond to the maximum accepted by the target device. For example, if the target device only accepts eight outstanding NCQ commands at a time, only eight commands may be forwarded by task scheduler 210, thus only bits 0-7 of register 240 are used.

Upon transport layer engine 220 and link layer 230 successfully issuing a NCQ command, the transport layer 220 hardware sets a corresponding bit in SActive register 240. Further, the transport layer 220 hardware clears a corresponding bit upon receiving a Set Device Bits (SDB) Frame Information Structure (FIS) from the target device. Transport layer 220 uses the bit patterns in SDB to clear the SActive register 240 bits. For example, the values of the received bits correspond to bits in register 240 that are to be cleared. Consequently, the HBA 144 firmware does not need to track how many NCQ commands it has issued and does not need to update SActive register when getting SDB FIS.

Figure 3:
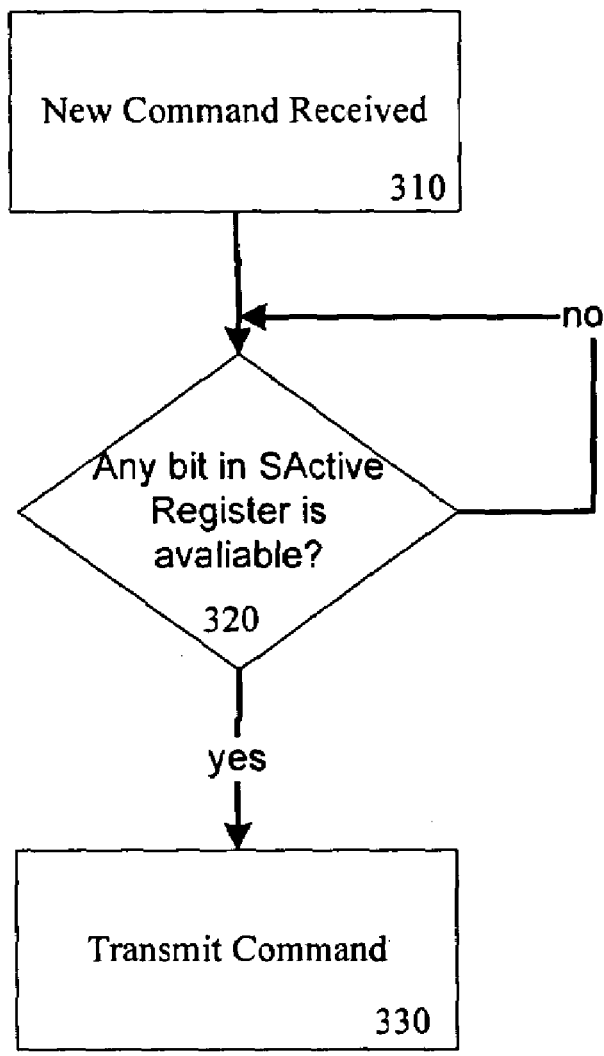
FIG. 3 illustrates one embodiment of a flow diagram for the operation of a task scheduler.

FIG. 3 is a flow diagram illustrating one embodiment of the operation of task scheduler 210. At processing block 310, a new NCQ command is received at task scheduler 210. At decision block 320, task scheduler 210 determines if a bit is available in SActive register 240. If available, a bit is set and the command is transmitted to the target device, processing block 330. Otherwise, control is returned to decision block 320 where it is again determined if a bit is available in SActive register 240. This process continues until one or more bits are cleared by transport layer engine 220, thus enabling the command to proceed to be scheduled and transmitted to the target.

According to one embodiment, if the SDB FIS indicates that one or more errors have occurred, all of the bits in SActive Register 240 are set so that task scheduler 210 cannot assign any new NCQ commands to transport layer engine 220 for the particular port, thus allowing both a firmware and hardware start error recovery processes.

Figure 4:
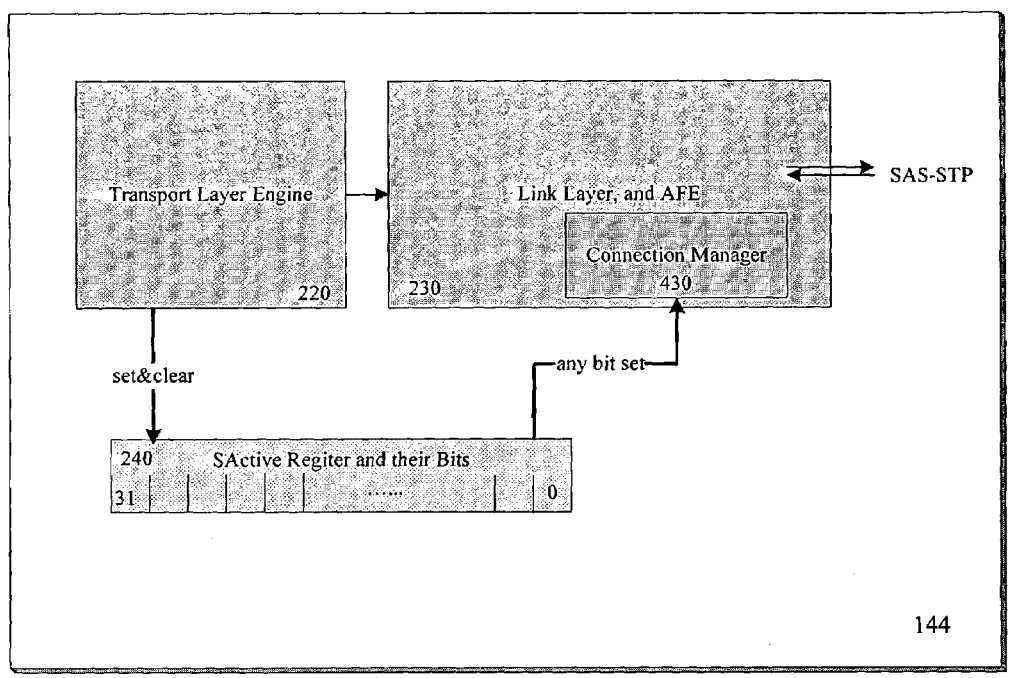
FIG. 4 illustrates another embodiment of a host bus adapter.

Since the transport layer engine 220 hardware manages SActive register 240 in SAS-STP mode, the link layer 230 hardware, in one embodiment, may use SActive register 240 for STP affiliation management. FIG. 4 illustrates one embodiment of HBA 144 where link layer 230 includes a connection manager 430. Connection manager 430 makes a connection to a target whenever there is a request to be sent to an SAS target device.

An affiliation is established by a particular port at the target device (target port) whenever an initiator port connects to the target port. After the connection is established, the initiator and the target devices can start sending and processing FIS's in STP. When the host (e.g., HBA 144) wants to end this connection, the host sends a CLOSE primitive to the target device.

In general, the CLOSE primitive has two aspects. The first aspect is CLOSE (normal), and the second is CLOSE (clear affiliation). When a target port has an affiliation with a specific initiator, the target must reject all connection requests by other initiators and can only accept connection to the initiator for which it has an affiliation.

According to one embodiment, an initiator, when closing connection to the target device, monitors SActive register 240 bits to determine if the initiator has outstanding commands to the target device. If all of the bits in SActive register 240 are zero, the initiator can issue CLOSE (Clear Affiliation) to the target. However, if at least one bit remains set the initiator issues CLOSE (normal) to the target.

Figure 5:
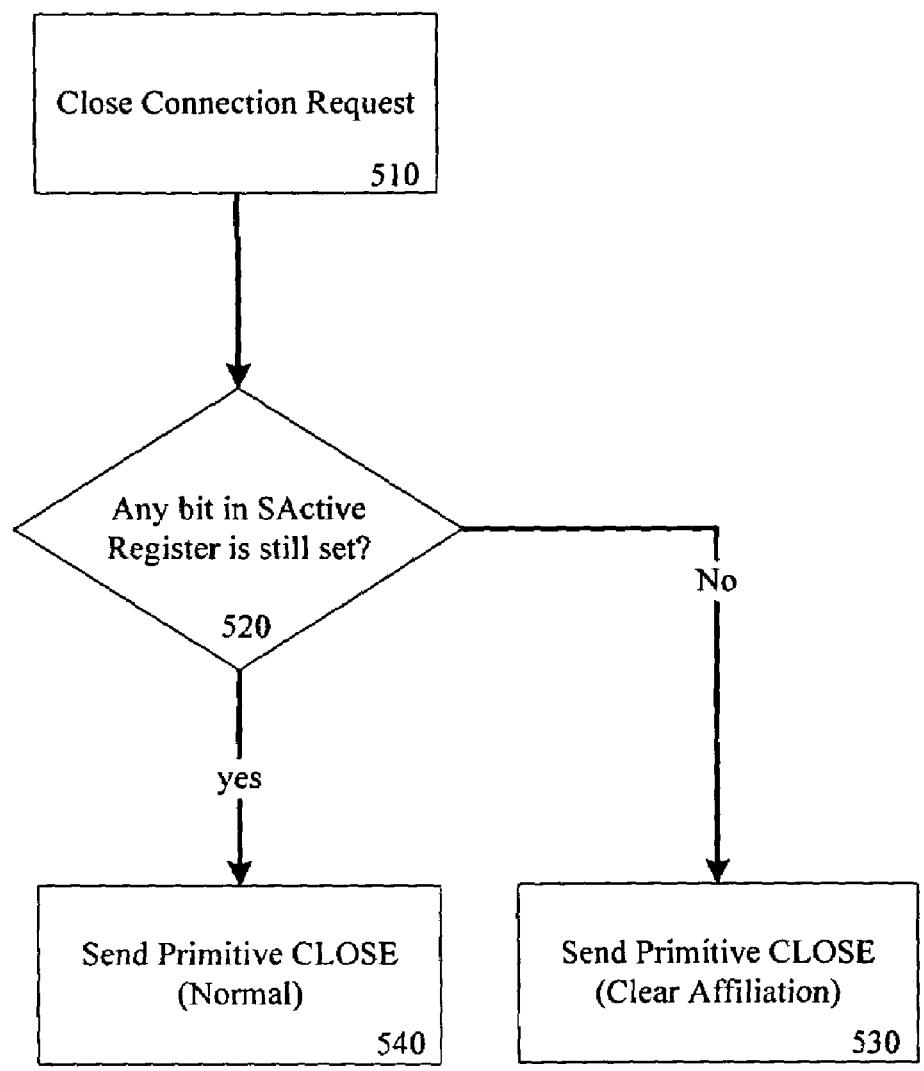
FIG. 5 illustrates one embodiment of a flow diagram for the operation of a connection manager.

FIG. 5 is a flow diagram illustrating one embodiment of the operation of connection manager 430. At processing block 510, a close connection request is received from the application layer. At decision block 520, connection manager 430 determines whether any bit in SActive register 240 is set. As discussed above, if all of the bits in SActive register 240 are zero, connection manager 430 can issue CLOSE (Clear Affiliation) to the target, processing block 530. If at least one bit remains set the initiator issues CLOSE (normal) to the target, processing block 540.

Note that the embodiments for hardware assisted SATA NCQ command scheduling and STP affiliation management described above are not limited to SATA NCQ commands. For non-NCQ commands, bit 0 of SActive register 240 may be used to perform the above services. This is possible because the non-NCQ commands' TAG fields (define) are reserved (or zero). Thus, the functionality can be achieved by masking out bits 1 to 31 in SActive register 240.

Moreover, in other embodiments, SActive register 240 may be accessed in other ways. For example, the SActive register 240 content may be cached in the transport layer 220 with task scheduler 210 and connection manager 430 having direct accessibility or when a connection is made to a specific target in STP mode.

Another embodiment features leaving the content in SActive register 240. Whichever component that needs information makes a request to access the content. In this embodiment, there is no need to write back an original SActive register 240 value and cache the new value after switching to service a different target.

Figure 6:
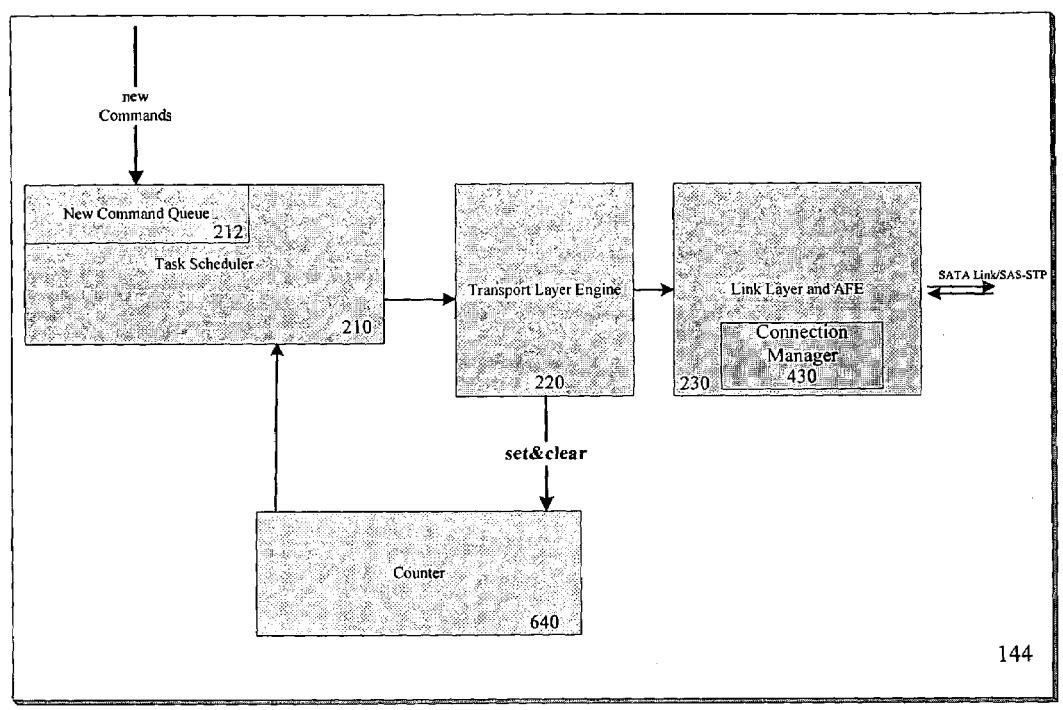
FIG. 6 illustrates yet another embodiment of a host bus adapter.

In other embodiments, the above described mechanisms may be implemented by monitoring other logic components. For example, FIG. 6 illustrates another embodiment of HBA 144, where counters 640 are used instead of SActive Register 240. In this embodiment, task scheduler 210, instead of monitoring SActive Register bits, monitors a counter value. If the counter value is not zero, task scheduler 210 can send a command or task to transport layer engine 220. When a command is successfully transmitted by the transport layer engine, the counter is decremented by one. Whenever a status FIS or SDB FIS is received, transport layer engine 220 increments the counter either by one or by the number of bits asserted in the SDB bit pattern field.

Note that counter 640 is disclosed as a countdown counter in this embodiment. In other embodiments, a count up counter may be implemented. In a further embodiment, the default value of counter 640 is set to the value based on the maximum target device queue depth. Similarly, for STP affiliation management, when the counter 640 value is at the default value, connection manager 430 may clear affiliation when sending CLOSE to the target.

The above-described mechanism performs via hardware assisted method, by scheduling SATA outstanding NCQ command via monitoring a SActive Register or a counter to reduce firmware scheduling. Further, STP affiliation management is performed to enable the clearing of affiliation via a SActive Register in order to reduce firmware STP connection processing.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims, which in themselves recite only those features regarded as essential to the invention.

What is claimed is:

1. A host device comprising:
  a logic component including:
    a first set of registers having a plurality of bits;
    a second set of registers having a plurality of bits, each corresponding to a command issued from an initiator to a target, the command being in accordance with a first protocol, wherein each of the plurality of bits in the first set of registers indicate a valid flag of a corresponding bit in the second register;
    a task scheduler to monitor the plurality of bits of the second register and to schedule a command if a bit in the second register indicates that a command is to be issued; and
    a connection manager to determine which of a plurality of close connection commands to issue to the target, the plurality of close connection commands including a first close connection command and a second close connection command, the first close connection command being to end a connection to the target but continue to maintain an affiliation with the target, the second close connection command being to end both the connection and the affiliation, and while the affiliation is maintained, the target rejects a connection request from another initiator;

if the first protocol is a certain serial protocol and all of a plurality of bits of a certain register are unset, the connection manager being to issue the second close connection command;

if the first protocol is other than the certain serial protocol, the connection manager determining which of the plurality of close connection commands to issue based upon state of a single one of the plurality of bits of the certain register.

2. The host device of claim 1 further comprising a transport layer engine to modify the first register upon a command being issued to the target device.

3. The host device of claim 1 wherein the bits in the second register are invalid if the corresponding bits in the first register indicate the entries are not valid.

4. The host device of claim 1 wherein the transport layer engine sets a bit in the second register upon a command being issued if the corresponding bit in the first register is enabled.

5. The host device of claim 3 wherein the transport layer engine clears the bit corresponding to the issued command upon receiving a Set Device Bits (SDB) Frame Information Structure (FIS) from the target device.

6. The host device of claim 2 wherein the logic component comprises a counter having a count value associated with a number of commands issued to the target device.

7. The host device of claim 6 wherein the task scheduler is permitted to issue a new command if the count value is not equal to zero.

8. The host device of claim 6 wherein the transport layer decrements the count value whenever a command is issued.

9. The host device of claim 6 wherein the transport layer increments the count value upon receiving a Set Device Bits (SDB) Frame Information Structure (FIS) from the target device.

10. The host device of claim 9 wherein the connection manager sends a primitive CLOSE (CLEAR AFFILIATION) to the target to end both the connection and the affiliation if the logic component indicates that no outstanding commands are currently issued to the target device.

11. The host device of claim 9 wherein the connection manager sends a primitive CLOSE (NORMAL) to the target to close the connection but maintain the affiliation if the logic component indicates that there currently are outstanding commands issued to the target device.

12. A method comprising:
receiving a first command at a task scheduler;
monitoring status of a logic component;
issuing the first command according to a first protocol from an initiator to a target device if the status of the logic component indicates that the first command may be issued; and
determining which of a plurality of close connection commands to issue to the target, the plurality of close connection commands including a first close connection command and a second close connection command, the first close connection command being to end a connection to the target but continue to maintain an affiliation with the target, the second close connection command being to end both the connection and the affiliation, and while the affiliation is maintained, the target rejects a connection request from another initiator;

if the first protocol is a certain serial protocol and all of a plurality of bits of a certain register are unset, issuing the second close connection command; and if the first protocol is other than the certain serial protocol, determining which of the plurality of close connection commands to issue based upon state of a single one of the plurality of bits of the certain register.

13. The method of claim 12 further comprising monitoring the status of the logic component if the status of the logic component indicates that the first command may not be issued.

14. The method of claim 12 further comprising:
modifying the status of the logic component upon issuing the first command to the target device; and
transmitting the first command to the target device.

15. The method of claim 14 wherein monitoring the status of a logic component comprises monitoring a register to determine if a bit is available.

16. The method of claim 14 wherein monitoring the status of a logic component comprises monitoring a count value in a counter.

17. The method of claim 12 further comprising:
issuing by a connection manager the second close connection command if the logic component indicates that no outstanding commands are currently issued to the target device.

18. The method of claim 17 further comprising issuing by a connection manager the first close connection command if the logic component indicates that there currently are outstanding commands issued to the target device.

19. A system comprising:
a target device;
a host bus adapter (HBA) having:
a logic component including:
a first set of registers having a plurality of bits; and
a second set of registers having a plurality of bits, each corresponding to an issued command according to a first protocol, wherein each of the plurality of bits in the first set of registers indicate a valid flag of a corresponding bit in the second register;
a task scheduler to monitor the plurality of bits of the second register and to schedule a command if a bit in the second register indicates that a command is to be issued; and
a connection manager to determine which of a plurality of close connection commands to issue to the target, the plurality of close connection commands including a first close connection command and a second close connection command, the first close connection command being to end a connection to the target but continue to maintain an affiliation with the target, the second close connection command being to end both the connection and the affiliation, and while the affiliation is maintained, the target rejects a connection request from another initiator;
if the first protocol is a certain serial protocol and all of a plurality of bits of a certain register are unset, the connection manager being to issue the second close connection command;
if the first protocol is other than the certain serial protocol, the connection manager determining which of the plurality of close connection commands to issue based upon state of a single one of the plurality of bits of the certain register.

20. The system device of claim 19 wherein the host device further comprises a transport layer engine to modify the first register upon a command being issued to the target device.

* * * * *